Dec. 19, 1922.
J. W. GOOCH.
SHOCK ABSORBER.
FILED OCT. 14, 1921.
1,439,307.
2 SHEETS—SHEET 1.
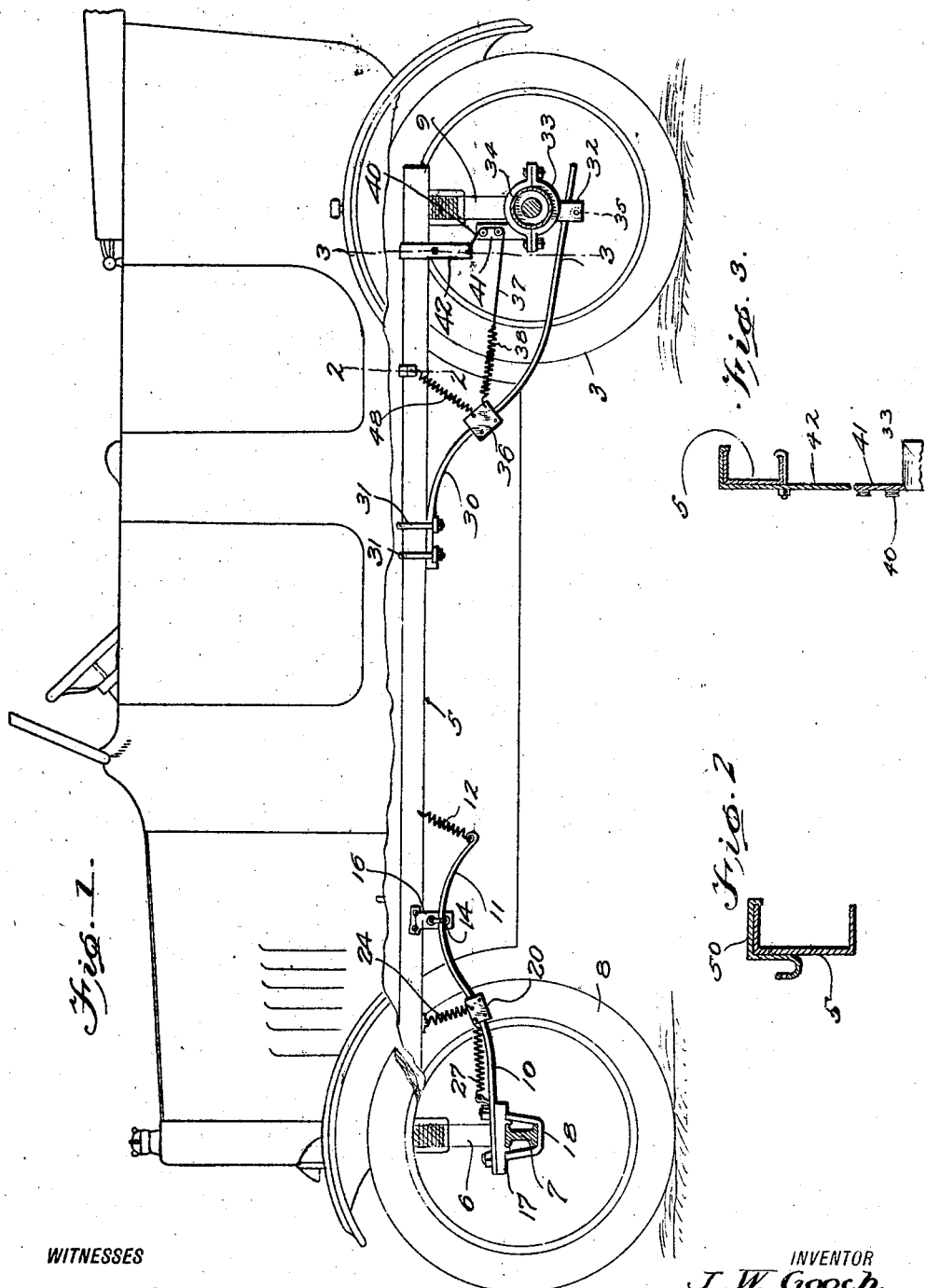
WITNESSES
INVENTOR
J. W. Gooch,
BY
ATTORNEYS

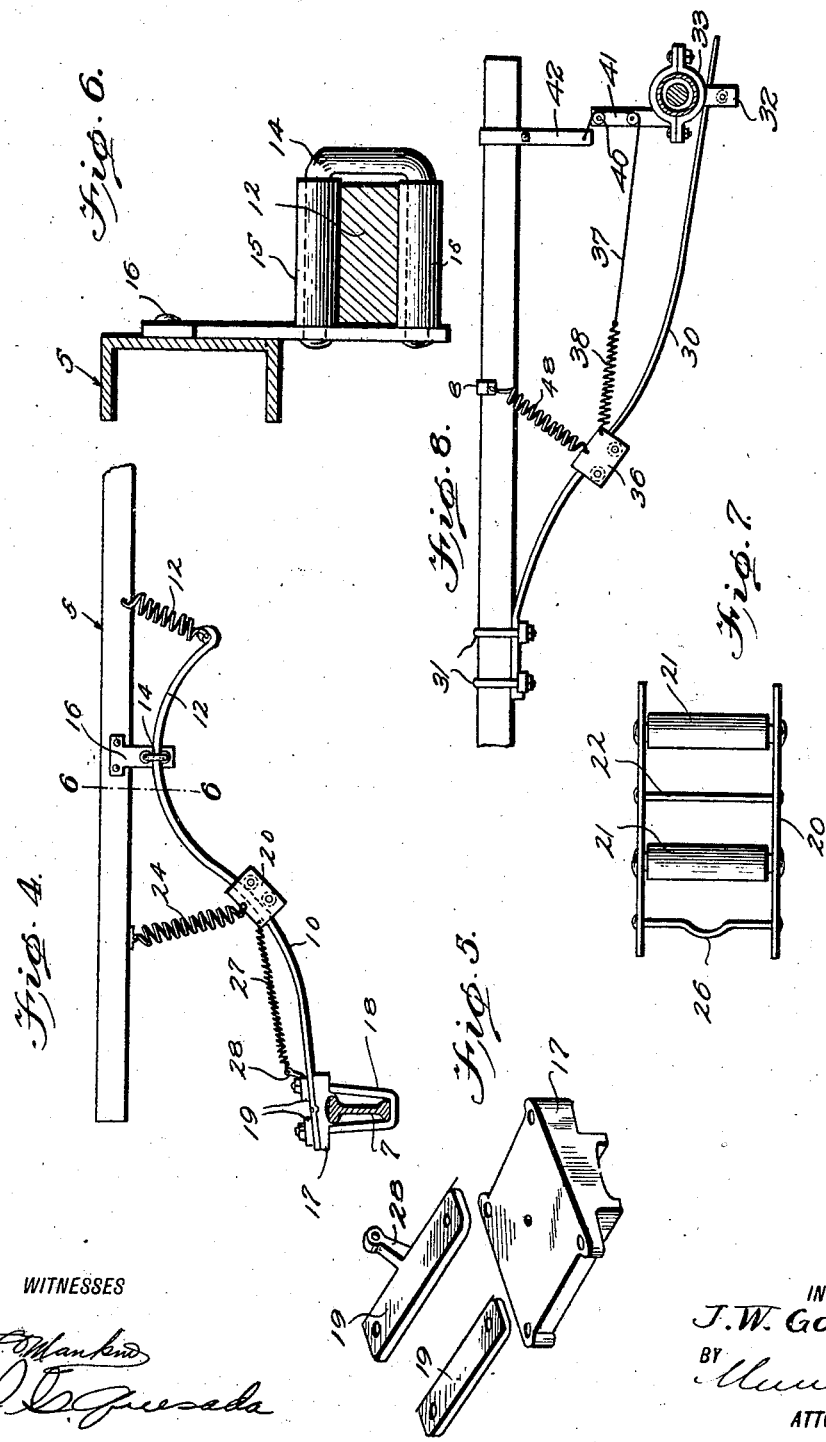

Patented Dec. 19, 1922.

1,439,307

UNITED STATES PATENT OFFICE.

JAMES WALTER GOOCH, OF SHAMROCK, TEXAS.

SHOCK ABSORBER.

Application filed October 14, 1921. Serial No. 507,626.

*To all whom it may concern:*

Be it known that I, JAMES WALTER GOOCH, a citizen of the United States, and resident of Shamrock, in the county of Wheeler and State of Texas, have invented certain new and useful Improvements in Shock Absorbers, of which the following is a specification.

This invention relates to shock absorbers especially adapted for use on motor vehicles. An important object of this invention is to provide a shock absorber having novel means whereby the rebound of the springs and the consequent discomfort to the occupants of the car may be reduced to a minimum.

A further object is to provide a shock absorber for vehicles having novel means whereby the same may be applied without substantially altering the construction of the vehicle.

Other objects and advantages of the invention will be apparent during the course of the following description.

In the accompanying drawing

Figure 1 is a side elevation of a shock absorber constructed in accordance with this invention, the shock absorber being shown applied.

Figure 2 is a detail transverse sectional view taken on line 2—2 of Figure 1.

Figure 3 is a vertical detail sectional view taken on line 3—3 of Figure 1.

Figure 4 is an enlarged side elevation of the shock absorber used in connection with the front wheels and axle of the vehicle.

Figure 5 is a group perspective of a spring seat and strap associated therewith.

Figure 6 is a detail sectional view taken on line 6—6 of Figure 4.

Figure 7 is a plan view of a carriage embodied in the invention.

Figure 8 is an enlarged side elevation of the shock absorber used in connection with the rear wheels of the vehicle, the shock absorber being shown applied.

In the drawings the numeral 5 designates the frame of a vehicle and in the case of the Ford automobile the front of the same is connected to a cross semi-elliptical laminated spring 6, the said spring being connected to the front axle 7 in the usual manner. When the vehicle and more particularly the front and rear wheels 8 and 9 respectively encounter an inequality in the roadway the wheels are moved upwardly with relation to the frame 5 due to the flexing of the front spring 6 and the rear spring 3 and the rebound or return of the spring to its original position causes a movement of the vehicle body which is highly objectionable to the occupants. It is therefore an important aim of this invention to provide simple means whereby sudden rebound of the springs may be reduced to a minimum.

In carrying out the invention a pair of longitudinally curved leaf springs 10 are connected to the axle 7 adjacent the ends of the same and the said leaf springs are bowed as indicated at 11 and are connected to the frame 5 by means of compression coiled springs 12. The rear portion 11 of the spring is also joined to the frame by means of a U-shaped guide 14 having its upper and lower sides provided with rollers 15 between which the bowed portion of the spring extends. The U-shaped guide and shackle is carried by an attaching plate 16 extending from the frame 5 and secured thereto by fastening device 14 of any suitable type. It will be seen that when the spring 10 is flexed as a result of the front wheel encountering an inequality in the road-way the bowed portion of the spring will move slightly between the rollers 15.

The forward portions of the leaf springs 10 are mounted upon spring seats 17 secured to the front axle by means of pairs of U-bolts 18, the said U-bolts being extended through the spring seats 17 and retaining straps 19 mounted upon the upper sides of the leaf springs 10.

As illustrated in Figures 1 and 4 a traveller 20 is mounted upon the forward portion of each leaf spring 10 and is provided with rollers 21 which contact with the under sides of the leaf spring. The intermediate portion of the carriage 20 is provided with a transversely extending bar or link 22 to which a contractile coiled spring 24 is connected, the said contractile coiled spring also being connected to the frame 5. The forward portion of the traveller is provided with a cross bar 26 through which a snubbing spring 27 is connected. The forward portion of the snubbing spring 27 is connected to one of the straps 19 by means of a projection or ear 28 formed thereon.

In operation when the front wheels encounter an inequality of the roadway the cross spring 6 is flexed and the leaf springs 10 are also flexed or moved upwardly. The leaf springs move upwardly and the snubbing springs 27 draw the traveller forwardly and the springs 24 serve as a means for yieldably holding the leaf springs in their flexed or upper positions. When the traveler 20 is advanced it gradually returns to its full line position illustrated in Fig. 4 and the cross spring 6 is permitted to gradually return to its normal position whereby the rebound is substantially lessened.

The cushioning means for the rear wheels 3 consists of a pair of leaf springs 30 having their forward portions secured to the frame by clips 31 and their rear portions extended through depending brackets 32 carried by semi-circular clamps 33, said semi-circular clamps being secured about the rear axle housing 34. A suitable roller 35 is carried by each bracket 32 and contacts with the under side of the adjacent leaf spring 30 so as to reduce the friction between the bracket 32 and the spring to a minimum. When the leaf spring illustrated in Figure 8 is flexed a traveller 36 slidable thereon is urged to its advanced or operative position by means of a cable 37 and a spring 38. As illustrated particularly in Figures 1 and 8 the cable 37 is passed about a pair of pulleys 40 secured on a bracket or post 41 carried by the rear clamp 33. The terminal portion of the cable 37 is connected to the lower end of a depending arm 42 carried by the frame and when the rear axle housing moves upwardly with relation to the frame the cable 37 will be drawn rearwardly for moving the traveller 36 in the same direction. By reason of this arrangement the traveller when advanced and the spring 48 which is connected to the traveller serve as a means for yieldably holding the rear or terminal portion of the spring in an elevated position. Therefore the rebound of the rear wheels and the spring 9 is also reduced to a minimum.

As illustrated in Figure 2 the spring 48 is secured to the frame by means of an attaching member 50 extended about the upper side of the frame and having a hook with which the spring 48 is adapted to be engaged.

Having thus described the invention, what is claimed is:—

1. A shock absorber for motor vehicles comprising a leaf spring having its forward portion provided with means whereby the same may be connected to the axle of the motor vehicle, a shackle adapted for slidably connecting the intermediate portion of the leaf spring to the motor vehicle, a coiled spring connecting the rear end of the leaf spring to the frame of the motor vehicle, a traveller slidable on said leaf spring, a snubbing spring connected to said traveller and anchored to the front axle of the motor vehicle, and a coiled spring connecting the snubbing spring to the frame of the motor vehicle.

2. A shock absorber for motor vehicles comprising a leaf spring having its rear end portion curved longitudinally, means whereby the forward portion of said leaf spring may be secured to the front axle of the motor vehicle, a traveller slidable on said leaf spring and having rollers engaging the leaf spring, a snubbing spring connected to said traveller and urging the same to the forward portion of said leaf spring, and a coiled spring connected to said traveller and adapted to permit of the gradual return of the leaf spring to its original position upon being flexed.

3. A shock absorber for motor vehicles comprising a leaf spring having its rear end portion curved longitudinally, means whereby the forward portion of said leaf spring may be secured to the front axle of the motor vehicle, a traveller slidable on said leaf spring and having rollers engaging the leaf spring, a snubbing spring connected to said traveller and urging the same to the forward portion of said leaf spring, a coiled spring connected to said traveller and adapted to permit of the gradual return of the leaf spring to its original position upon being flexed, and a coiled spring connected to the rear end of said leaf spring.

4. A shock absorber for motor vehicles comprising a longitudinally curved spring, means whereby the same may be secured to the rear axle housing of a motor vehicle, a traveller slidable on said leaf spring, a coiled spring connected to said traveller and adapted for permitting of the gradual return of the leaf spring to its normal position upon being flexed, a snubbing spring connected to said traveller, a cable connected to said snubbing spring, and relatively stationary and movable brackets having connection with said cable.

5. A shock absorber for motor vehicles comprising a longitudinally curved leaf spring, a clamp adapted for connection with the rear axle housing and having a depending bracket slidably receiving said leaf spring, a traveller slidable on said leaf spring, a snubbing spring connected to said traveller and having a cable, a movable bracket carried by said clamp, and a relatively stationary bracket having means whereby the same may be secured to the vehicle frame, the terminal portion of said cable being connected to said relatively stationary bracket, pulleys carried by said movable bracket and having connection with said cable, and a spring connected to said traveller and adapted for delaying the return of the spring to its normal position upon being flexed.

JAMES WALTER GOOCH.